Jan. 5, 1965 M. W. FLETCHER 3,164,774
READOUT CONTROL CIRCUIT FOR DIGITAL DATA GENERATING SHORT-DURATION PULSES PREDETERMINED TIME INTERVAL AFTER RELATIVELY LONG-DURATION PULSES
Filed Aug. 14, 1962
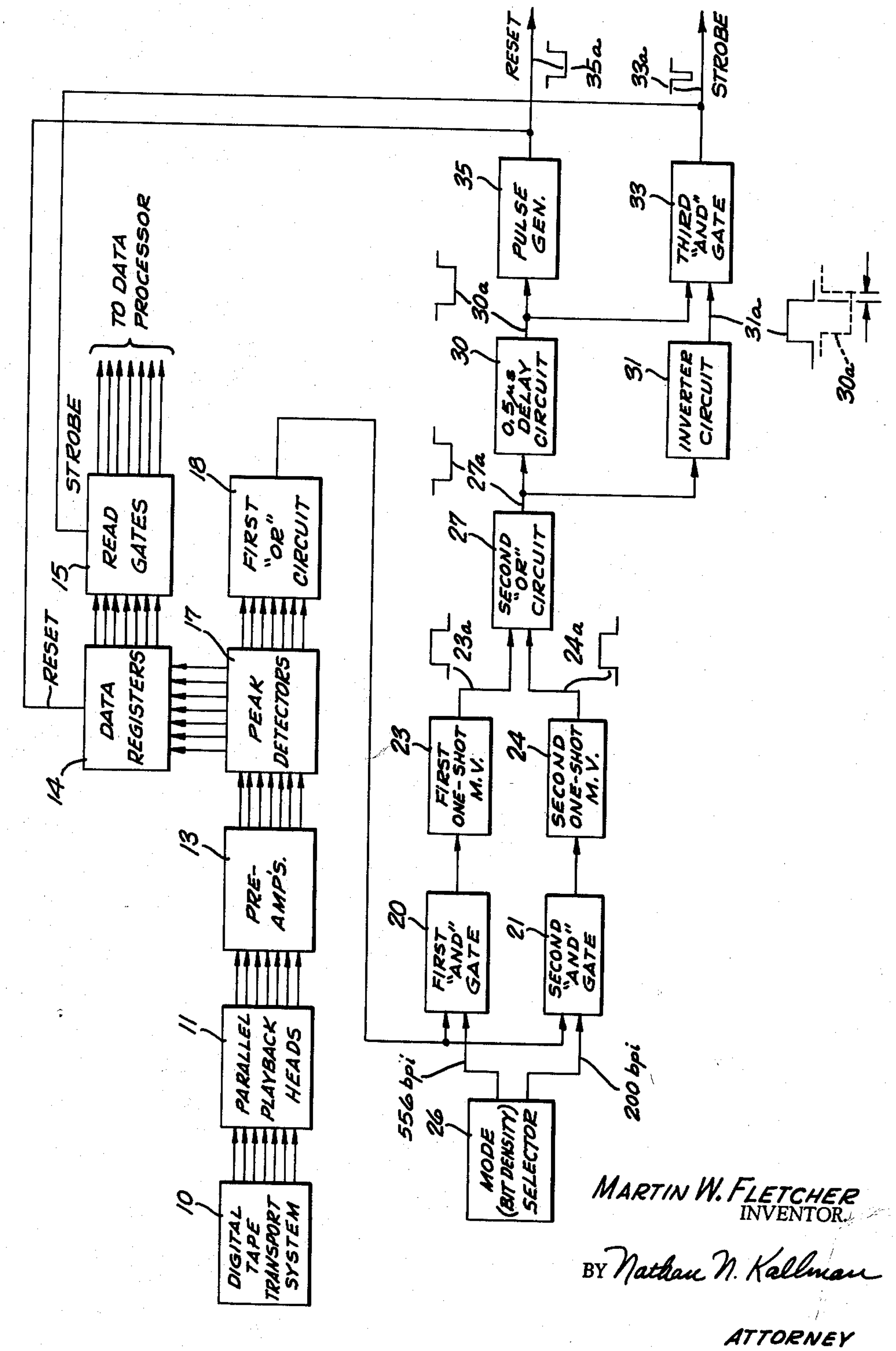
MARTIN W. FLETCHER
INVENTOR.
BY Nathan N. Kallman
ATTORNEY United States Patent Office 3,164,774

Patented Jan. 5, 1965

3,164,774

READOUT CONTROL CIRCUIT FOR DIGITAL DATA GENERATING SHORT-DURATION PULSES PREDETERMINED TIME INTERVAL AFTER RELATIVELY LONG-DURATION PULSES

Martin W. Fletcher, Palo Alto, Calif., assignor to Ampex Corporation, Redwood City, Calif., a corporation of California Filed Aug. 14, 1962, Ser. No. 216,826

6 Claims. (Cl. 328—61)

This invention relates to digital data processing systems, and particularly to circuits for controlling the derivation of parallel binary digits from a number of channels.

In digital data processing equipment, it is often necessary to take special steps to realign data bits. A most common example of this need is found in the readout of parallel binary digits from a magnetic tape. With modern high density, high speed, digital recording techniques, successive characters, each consisting of a number of parallel binary digit recordings, are derived at high repetition rates by a multi-head reproducing device. With densely packed characters, however, it becomes necessary to use special techniques and compensation to account for such fixed effects as misalignment of the ostensibly parallel heads and such dynamic effects as skewing of the tape during recording and reproduction.

Usually, the parallel data bits are fed into a number of individual registers, and a strobe pulse is then used to sense the condition of these registers, following which the registers are reset for the succeeding group of parallel data bits. At high repetition rates, it is necessary that the strobe pulse be of very brief duration, and it is important that it be precisely generated. Further, following the strobing it is most desirable that the registers be reset very rapidly so as to be ready for the reception of the first arriving bit of the next succeeding character.

With slow speed systems, straight-forward pulse generating and gating techniques may be employed in performing the strobing and resetting functions, and no particular problems are encountered. In high density systems, however, the strobe pulse and the succeeding reset interval may each be required to be performed within a very short time, such as a fraction of a microsecond. When these conditions apply, it has been necessary to utilize complex and expensive arrangements in order to provide the necessary speed. Even so it has usually been required to use a substantial proportion of the character period for strobing, and the stability of the performance of the succeeding reset function has been far from satisfactory.

When operating at speeds that are this high, it also becomes extremely difficult to arrange the equipment so as to provide the strobing and reset function satisfactorily for different bit densities. Certain standard bit densities have now been adopted for data processing applications, including 200 and 556 bits per inch. It is of course desirable to perform the needed functions with common circuits wherever possible, despite variations in bit density.

It is therefore an object of the present invention to provide an improved system for reading out parallel data bits in a digital data processing system.

Another object of the present invention is to provide an improved strobing and reset circuit for parallel data bits read from magnetic tape.

In accordance with the present invention, both strobe pulses and reset pulses of short but precise time duration are generated through the use of a delay line circuit in conjunction with pulse generating and gating circuitry.

In a specific example of a circuit in accordance with the invention, parallel data bits derived during readout are utilized to actuate a pulse generator circuit that controls both a delay circuit and an inverter circuit, which together control the input terminals of an "AND" gate. The relay circuit provides a precise but very short delay, of a fraction of a microsecond in the present example. The output signal from the "AND" gate constitutes the desired strobe pulse, and corresponds in duration to the time interval of the delay circuit. The reset pulse is then derived from the trailing edge of the pulse provided from the delay circuit, this reset pulse having a precise time relation to the strobe pulse in each instance. This arrangement then permits different bit densities to be compensated for simply by the employment of a different pulse generator for providing pulses to the delay circuit and the inverter.

A better understanding of the invention may be had from the following description and the accompanying drawing, the sole figure of which is a block diagram of a system for providing clocking control in accordance with the invention.

The system is assumed to operate in conjunction with a typical magnetic tape system, and a digital data processor, details of both of which may be conventional and accordingly are omitted for simplicity. It is sufficient for present purposes to include the digital tape transport system 10, which is assumed to provide data at two different bit densities, i.e., 200 bits per inch and 556 bits per inch. With seven bit characters (assumed here for convenience although other codes may be employed as well), the seven bits of each character are read in parallel by the playback heads 11. Because of skew effects and head misalignment problems, as above noted, it is necessary to realign the individual binary digits of each character into exact time synchronism. After coupling through preamplifiers 13, the parallel data bit signals are directed through peak detectors 17, which provide detection of the digital information, to a set of one bit data registers 14 that individually control different ones of a group of read gates 15.

When the data registers 14 are set with a pattern of data pulses, they condition the corresponding read gates 15, so that when a strobe pulse is thereafter applied to the read gates 15 the same character is read out, with all bits in parallel. It must be recognized that with high density recordings, this strobing action must take place within a small part of the character period, in order for the data registers 14 to be reset and thus be ready in a fraction of a microsecond for the receipt of the data pulses of the next character.

For these purposes, the circuits that presently illustrate the invention by way of example, detect the leading bit pulse of a character by use of a group of peak detectors 17 which feed a seven-way first "OR" circuit 18. The peak detector circuits 17 may be of types which respond to a peak of one or either polarity in the binary-valued signal sequence (depending on the recording technique used), to provide a voltage spike of a selected polarity at the minimum slope point which marks the positive or negative peak. The first "OR" circuit 18 responds to the first of these voltage spikes on any of the channels by providing a corresponding actuating signal to a pair of "AND" gates 20, 21. A first of these "AND" gates 20 controls input signals to a first one-shot multivibrator 23, while the second "AND" gate 21 independently controls a second one-shot multivibrator 24. The two "AND" gates 20, 21 are separately operated at mutually exclusive times by a mode selector 26, which may consist of appropriate circuit couplings to those relays which are used in bit density selection at the tape transport unit.

The pulses generated by the one-shot multivibrators 23, 24 are proportioned to the repetition rates achieved with the 556 and 200 b.p.i. densities, respectively, and will usually be of the order of several microseconds. The higher the repetition rate, of course, the shorter this interval must be.

Output signals from the first and second one-shot multivibrators 23, 24 are coupled together at a second "OR" circuit 27 and then passed through a pulse gating and generating arrangement. This arrangement utilizes a passive delay circuit 30 and an inverter circuit 31, each of which are coupled to receive the output signals from the second "OR" circuit 27. For ease of visualization, representative waveforms bearing the suffix "*a*" are shown associated with the output circuit of each of the circuit units. Thus, the one-shot multivibrators 23, 24 provide positive pulses 23*a*, 24*a* respectively when actuated, and the second "OR" circuit 27 additionally functions as an inverter to provide negative-going rectangular pulses 27*a* of the same duration as the individual input pulse which is used. The most negative level of the signal is used to actuate a succeeding "AND" gate. The output signal from the delay circuit 30 is a replica of the input signal, but delayed by 0.5 microsecond. The output signal 31*a* from the inverter circuit 31 represents an undelayed mirror image.

The signals from both the delay circuit 30 and the inverter circuit 31 are applied to a third "AND" gate 33 which generates the strobe pulses. Only the output signal from the delay circuit 30 is applied to a pulse generator 35 which generates the reset signals for the system. The pulse generator 35 may include a differentiating circuit and a monostable multivibrator, in order that a pulse is provided with a leading edge that is coincident with the trailing edge of the pulse from the delay circuit 30.

This system operates so that only 0.5 microsecond of the bit period is used for strobe-out of data within the character period and also to provide the reset pulse with a minimum delay following the strobe, under all conditions of operation.

As the data bits of a character are picked up by the playback heads 11 and entered into the data registers 14 through the preamplifiers 13, a pulse representative of the leading data bit in the ostensibly parallel group is generated by the associated circuitry. The use of the peak detectors 17 assists in precisely locating the maximum amplitude signal level of each of the data bits. Concurrently an unambiguous indication of the presence of the data bit and its time relation to the other data bits is provided. The first of these pulses in time actuates whichever of the first or second "AND" gates 20, 21 is then conditioned by the mode selector 26.

With these high density systems, operating at data repetition rates of 50 kilocycles per second or 100 kilocycles per second there is only a very brief interval, following the location of the data bit at the nominal midpoint of a character period, for accomplishing the strobing and reset functions. Head misalignment, tape skew and other factors can introduce leading or lagging of the data pulses within the character period. The lead or lag may be a substantial portion of the character period. Allowing a maximum build-up of tolerances in the tape skew, data bits must not overlap from one character period to another, but they nevertheless may establish a very brief time interval between the lagging pulse of one character and the leading pulse of the next. Prior art strobing and reset techniques required a relatively long time, as much as 25% of the character period, for the strobing alone. The addition of a relatively long interval before the onset of reset of the registers, then provision for a certain amount of variation in the time at which the registers are reset, have also been typical.

Strobe pulses of brief but precisely defined duration (the increment of delay of the delay circuit 30) are derived by actuating the third "AND" gate 33 by the pulses from the delay circuit 30 and the inverter circuit 31. The third "AND" gate 33 is actuated by the more negative levels of the waveforms 30*a*, 31*a*. That is, the negative going pulses in the waveform 30*a* from the delay circuit 30 and the base line level of the waveform 31*a* from the inverter circuit 31 when concurrently present activate the third "AND" gate 33. As shown by the dotted line representation of the waveform 30*a'*, which represents the delayed version of the negative going pulse from the second "OR" circuit 27, these signals are provided only for the 0.5 microsecond preceding the termination of the delayed pulse. The strobe pulse 33*a* thus activates the read gates 15 to provide the character to the data processor. The time of strobing following the detection of the first peak of a data pulse in the character is determined by the one-shot multivibrator 23 or 24 which is employed. The active period of these one-shots is determined by the expected amount of misalignment of the data pulses, as well as the repetition rate, and insures that all the data registers are set before the read gates 15 are strobed.

When the strobing is completed, the reset function may take place substantially immediately, and to this end the same trailing edge of the delay pulse which terminates the strobe pulse is utilized to initiate the reset signal. The pulse waveform 35*a* provided from the pulse generator 35 thus is initiated without substantial delay, but in constant and fixed time relation to the trailing edge of the strobe pulse, because the action is in each instance uniform. Thus the data register 14 may very rapidly be reset for the entry of the data pulses of the next succeeding character.

While there have been described above a number of different circuits and arrangements of a data processing system utilizing nominally parallel binary digits, it will be appreciated that the invention is not limited thereto. For example, instead of employing a seven bit character system, it is possible to utilize a clock track system with the binary bits being recorded successively on longitudinal tracks. Generally, any parallel bit arrangement may be used within the scope of this invention. Accordingly, the invention is to be considered to include all modifications, variations and alternative arrangements falling within the scope of the appended claims.

What is claimed is:

1. A circuit for providing a short interval strobing and reset for substantially parallel binary data signals reproduced at high speed from binary data recorded with high density on magnetic tape and including means responsive to each group of binary signals for providing a common signal initiated by a selected characteristic of the selected binary bit of a parallel character, comprising:

one-shot pulse generator means responsive to the common signal for generating a rectangular pulse having a width approximately one-half the width of the binary data bit period;

passive delay means providing a delay interval of predetermined relatively short duration and coupled to receive the rectangular pulses;

means including gating means for generating strobe pulses each having a leading edge coincident with the trailing edge of the rectangular pulse and a trailing edge coincident with the trailing edge of the delayed rectangular pulse;

resettable data register means coupled to receive each group of substantially parallel data signals;

gating means responsive to the data register means and coupled to be controlled by the strobe pulses; and means responsive to the trailing edge of the delayed rectangular pulses for resetting the data register means.

2. A circuit for generating short duration pulses of standard width occurring at a predetermined interval after the receipt of a relatively long duration pulse comprising:

means for generating a timing pulse equal to said interval, said means responsive to a leading edge of said long duration pulse;

a gating circuit means for combining a plurality of inputs;

a pair of circuit means for connecting said timing pulse generating means to said gating circuit means;

one of the pair of the connecting circuit means including delay means for delaying the timing pulse an amount equal to said standard duration, the other of said pair of circuit means including inverting means for inverting the timing pulse;

said gating circuit means responsive to the pulses from said pair of connecting circuit means to pass that portion of the delayed timing pulse occurring after the trailing edge of the inverted timing pulse.

3. A strobe pulse producing circuit for strobing a group of substantially time coincident binary data pulses being received comprising:

means for generating a pair of timing pulses of equal pulse width having a predetermined interval of separation between their respective leading and trailing edges, said interval of separation being less than the pulse width of said timing pulses whereby an overlap between the pair of timing pulses is defined, said means for generating responsive to the leading edge of a pulse indicative of a selected bit of a parallel character;

a gating circuit means for receiving said timing pulses individually and for responding to the overlap of the timing pulses to produce a short duration strobing pulse at a predetermined time interval after the leading edge of said selected bit pulse said gating means coupled to said means for generating.

4. In a system for reading the presence of groups of binary data pulses contained in separate information channels in substantially parallel fashion, a pulse reading system comprising:

a plurality of data registers for registering the presence of the binary data pulse in each separate channel, said data registers being resettable;

sensing circuit means connected to each of said data registers for providing an output signal coincident with the leading edge of a pulse representing the selected bit of a parallel character;

a one-shot multivibrator circuit coupled to said sensing circuit and responsive to the output of said sensing circuit to produce a timing pulse having a leading edge corresponding to the leading edge of the selected bit pulse the duration of said timing pulse being approximately one-half the duration of said binary data pulses;

gate means having input, output and control terminals, said multivibrator circuit being connected to the conrol terminal of said gating means to deliver said timing pulse thereto;

a delay circuit connected between said multivibrator circuit in the input terminal of said gating means to delay said timing pulse by a predetermined interval of time, said gating means being effective to pass only that portion of the delayed timing pulse occurring after the trailing edge of said timing pulse, whereby a strobing pulse having a duration equal to said predetermined interval occurs at the output terminal of said gating means;

a plurality of output gates individually connected to each of said data registers to pass therethrough the pulses of varying magnitudes existing at each data register when a strobing pulse is applied to each said output gate, the output of said gating means being connected to each of said output gates whereby said strobing pulse is delivered thereto;

differentiating means connected to the input of said gating means for producing a voltage spike coincident with the trailing edge of said delayed timing pulse, said differentiating means being coupled to reset said data registers, whereby an indication of the presence or polarities of each of said binary data pulses in a group is obtained from said output gates at a time corresponding to the approximate time interval between preceding and succeeding data characters.

5. A circuit for providing a very short time duration strobe pulse and a substantially immediately following reset pulse for substantially parallel binary data signals reproduced at high data rates from binary data recorded with high density on magnetic tape comprising:

means for reproducing the substantially parallel binary data signals;

resettable data register means responsive to the reproducing means for receiving an inmmediate group of binary data signals;

read gate means coupled to the controlled data registers and coupled to the actuated strobe pulses;

peak detector means responsive to the reproducing means for providing peak indication signals;

"OR" circuit means responsive to the peak detector means for indicating the leading binary signal of a group;

a pair of one-shot multivibrators, the one-shot multivibrators having different active time intervals in response to an actuating pulse;

selectively actuable gating means controllable in accordance with the repetition rate of the data for applying actuating pulses to one of the one-shot multivibrators;

passive delay means coupled to receive pulses from the one-shot multivibrators, the passive delay means providing a delay interval of selected duration;

inverter means coupled to receive pulses from the one-shot multivibrator means;

coincident gating means coupled to the passive delay means and the inverter means for providing a strobe pulse during intervals defined by the trailing edge of the interval pulse and the trailing edge of the delayed pulse; and pulse generating means responsive to the trailing edge of the delayed pulse and coupled to provide signals to the resettable data register means.

6. The invention as set forth in claim 5 above, wherein the data repetition is substantially in excess of 10,000 characters per second, and the passive delay means provides a delay of the order of a microsecond or less.

References Cited in the file of this patent

UNITED STATES PATENTS

| | | |
|---|---|---|
| 3,028,552 | Hahs | Apr. 3, 1962 |
| 3,093,797 | Lubkin | June 11, 1963 |